ized Patent

(12) United States Patent
Kim

(10) Patent No.: US 11,044,368 B2
(45) Date of Patent: *Jun. 22, 2021

(54) APPLICATION PROCESSOR SUPPORTING LOW POWER ECHO CANCELLATION, ELECTRONIC DEVICE INCLUDING THE SAME AND METHOD OF OPERATING THE SAME

(71) Applicant: SAMSUNG ELECTRONICS CO., LTD., Suwon-si (KR)

(72) Inventor: Sun-Kyu Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 111 days.

This patent is subject to a terminal disclaimer.

(21) Appl. No.: 16/191,601

(22) Filed: Nov. 15, 2018

(65) Prior Publication Data

US 2019/0228788 A1 Jul. 25, 2019

(30) Foreign Application Priority Data

Jan. 25, 2018 (KR) ........................ 10-2018-0009388

(51) Int. Cl.
*H04M 9/08* (2006.01)
*G06F 3/16* (2006.01)
(Continued)

(52) U.S. Cl.
CPC ............ *H04M 9/082* (2013.01); *G06F 3/167* (2013.01); *G10L 15/22* (2013.01); *G10L 15/28* (2013.01);
(Continued)

(58) Field of Classification Search
CPC ..... G10L 21/0202; G10L 15/22; G10L 15/28; G06F 3/167
See application file for complete search history.

(56) References Cited

U.S. PATENT DOCUMENTS 8,036,413 B2 10/2011 Kim
8,538,034 B2 9/2013 Eriksson et al.
(Continued)

FOREIGN PATENT DOCUMENTS

CN 101106405 A 1/2008
CN 101167403 A 4/2008
CN 101878637 A 11/2010

OTHER PUBLICATIONS

Communication dated May 6, 2021, issued by the State Intellectual Property Office of P.R. China in Chinese Application No. 201910031791.7.

*Primary Examiner* — Sonia L Gay
(74) *Attorney, Agent, or Firm* — Sughrue Mion, PLLC

(57) ABSTRACT

An application processor is provided. The application processor includes a system bus, a host processor, a voice trigger system and an audio subsystem that are electrically connected to the system bus. The voice trigger system performs a voice trigger operation and issues a trigger event based on a trigger input signal that is provided through a trigger interface. The audio subsystem processes audio streams through an audio interface. While an audio replay is performed through the audio interface, the application processor performs an echo cancellation with respect to microphone data received from a microphone to generate compensated data and the voice trigger system performs the voice trigger operation based on the compensated data.

8 Claims, 19 Drawing Sheets

(51) Int. Cl.
  *G10L 15/22* (2006.01)
  *G10L 15/28* (2013.01)
  *G10L 21/0208* (2013.01)

(52) U.S. Cl.
  CPC ............... *G10L 2015/225* (2013.01); *G10L 2021/02082* (2013.01)

(56) References Cited

U.S. PATENT DOCUMENTS

| | | |
|---|---|---|
| 9,251,806 B2 | 2/2016 | Shah et al. |
| 9,542,933 B2 | 1/2017 | Mortensen |
| 9,582,983 B2 | 2/2017 | Dadu et al. |
| 9,679,563 B2 | 6/2017 | Lee et al. |
| 2002/0055844 A1* | 5/2002 | L'Esperance ........... G10L 15/26 704/260 |
| 2006/0047754 A1* | 3/2006 | Wenkata Subramanian ................ G06F 15/167 709/206 |
| 2013/0311797 A1* | 11/2013 | Ahmad ................ G06F 1/3209 713/310 |
| 2014/0222436 A1 | 8/2014 | Binder et al. |
| 2015/0221307 A1* | 8/2015 | Shah ....................... G06F 3/165 704/253 |
| 2016/0217795 A1 | 7/2016 | Lee et al. |
| 2017/0031430 A1* | 2/2017 | Ansorregui ........... G06F 1/3203 |
| 2017/0078489 A1* | 3/2017 | Lashkari ............ G10L 21/0208 |
| 2019/0207777 A1* | 7/2019 | Patel ....................... H04L 12/12 |

\* cited by examiner

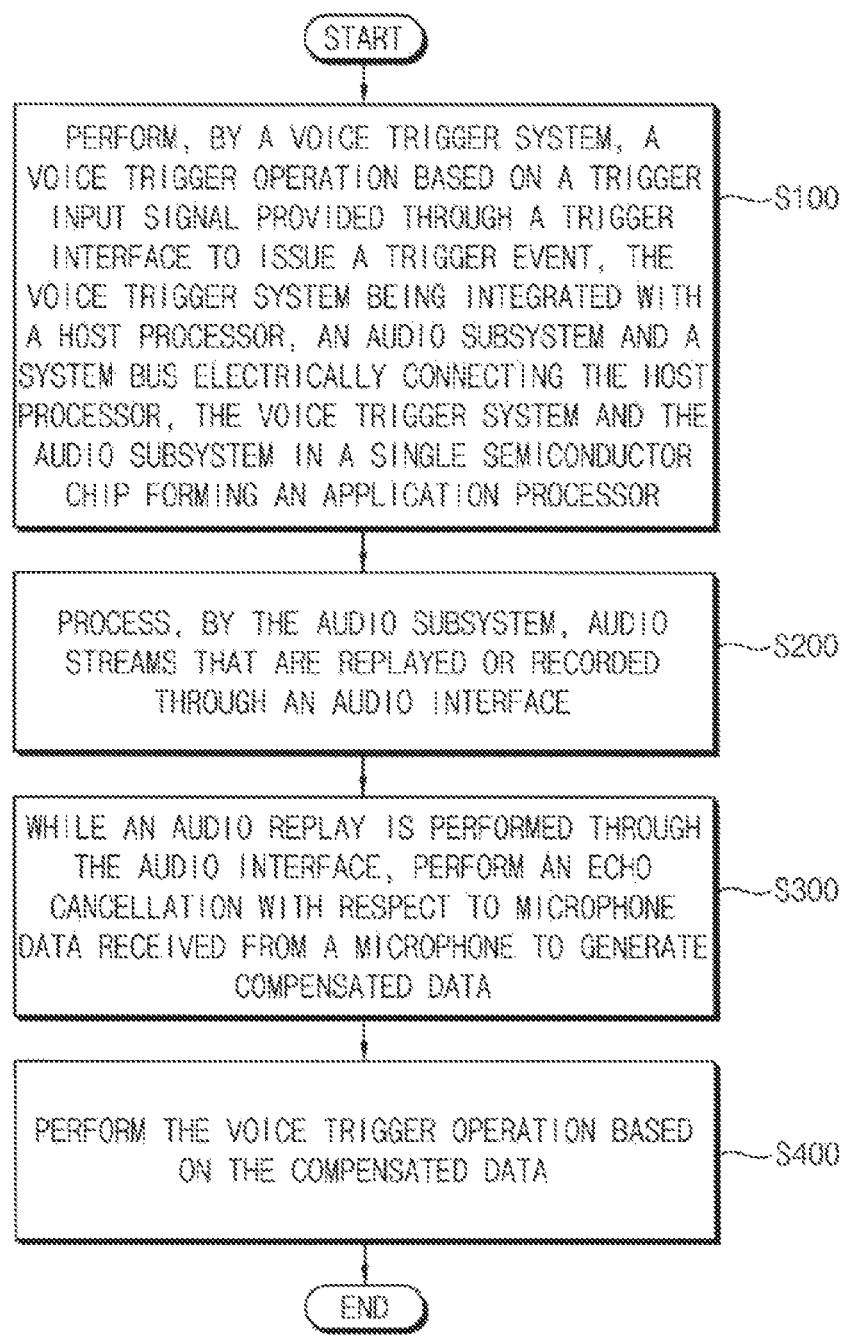

APPLICATION PROCESSOR SUPPORTING LOW POWER ECHO CANCELLATION, ELECTRONIC DEVICE INCLUDING THE SAME AND METHOD OF OPERATING THE SAME

CROSS-REFERENCE TO RELATED APPLICATION

This U.S. Non-provisional application claims priority under 35 USC § 119 to Korean Patent Application No. 10-2018-0009388, filed on Jan. 25, 2018, in the Korean Intellectual Property Office (KIPO), the disclosure of which is incorporated by reference in its entirety herein.

BACKGROUND

1. Technical Field

Apparatuses, methods, devices, and articles of manufacture consistent with the present disclosure relate generally to semiconductor integrated circuits, and more particularly to an application processor supporting low power echo cancellation, an electronic device including the application processor and an associated method.

2. Discussion of the Related Art

Recently, voice-based or sound-based intelligent interfaces have been introduced. One advantage of such voice-based intelligent interfaces is that users can interact with a device in a hands-free manner without handling or even looking at the device. Hands-free operation can be particularly beneficial when a person cannot or should not physically handle a device, such as when they are driving or when they have a disability, etc. However, to initiate the voice-based intelligent interface, users typically must press a button or select an icon on a touch screen. This tactile input detracts from the user experience of the voice-based intelligent interface.

Accordingly, the electronic devices have been developed to activate a voice-based intelligent interface using inputs of voice, speech, sound, sensing, etc., rather than a tactile input. The electronic device performs continuous or intermittent monitoring of an audio channel to detect the voice input and issue a trigger event for initiating the voice-based intelligent interface. The operation for issuing the trigger event may be referred to as a voice trigger operation. This monitoring of the audio channel consumes electrical power, which is a limited resource on handheld or portable devices that rely on batteries. Thus, it is advantageous to provide an energy-efficient solution associated with the voice trigger operation.

SUMMARY

It is an aspect to provide an application processor and an electronic device including an application processor capable of supporting low power echo cancellation.

It is another aspect to provide a method of operating an application processor capable of supporting low power echo cancellation.

According to an aspect of one or more example embodiments, an application processor includes a system bus, a host processor, a voice trigger system and an audio subsystem that are electrically connected to the system bus. The voice trigger system performs a voice trigger operation and issues a trigger event based on a trigger input signal that is provided through a trigger interface. The audio subsystem processes audio streams through an audio interface. While an audio replay is performed through the audio interface, the application processor performs an echo cancellation with respect to microphone data received from a microphone to generate compensated data and the voice trigger system performs the voice trigger operation based on the compensated data.

According to another aspect of one or more example embodiments, an electronic device includes at least one audio input-output device; and an application processor comprising a system bus; a host processor electrically connected to the system bus; a voice trigger system electrically connected to the system bus, the voice trigger system being configured to perform a voice trigger operation and issue a trigger event based on a trigger input signal that is provided through a trigger interface; and an audio subsystem comprising an audio interface and electrically connected to the system bus, the audio subsystem being configured to process audio streams through the audio interface, wherein, while an audio replay is performed through the audio interface, the application processor performs an echo cancellation with respect to microphone data received from a microphone to generate compensated data and the voice trigger system performs the voice trigger operation based on the compensated data.

According to another aspect of one or more example embodiments, a method of operating an application processor, includes performing, by a voice trigger system, a voice trigger operation based on a trigger input signal provided through a trigger interface to issue a trigger event, the voice trigger system being integrated, in a single semiconductor chip forming the application processor, with a host processor, an audio subsystem and a system bus electrically connecting the host processor, the voice trigger system and the audio subsystem; processing, by the audio subsystem, audio streams through an audio interface of the audio subsystem; while an audio replay is performed through the audio interface, performing an echo cancellation with respect to microphone data received from a microphone to generate compensated data; and performing, by the voice trigger system, the voice trigger operation based on the compensated data.

BRIEF DESCRIPTION OF THE DRAWINGS

Example embodiments will be more clearly understood from the following detailed description taken in conjunction with the accompanying drawings, in which:

FIG. 1 is a flow chart illustrating a method of operating an application processor according to example embodiments;

DETAILED DESCRIPTION

Figure 2A:
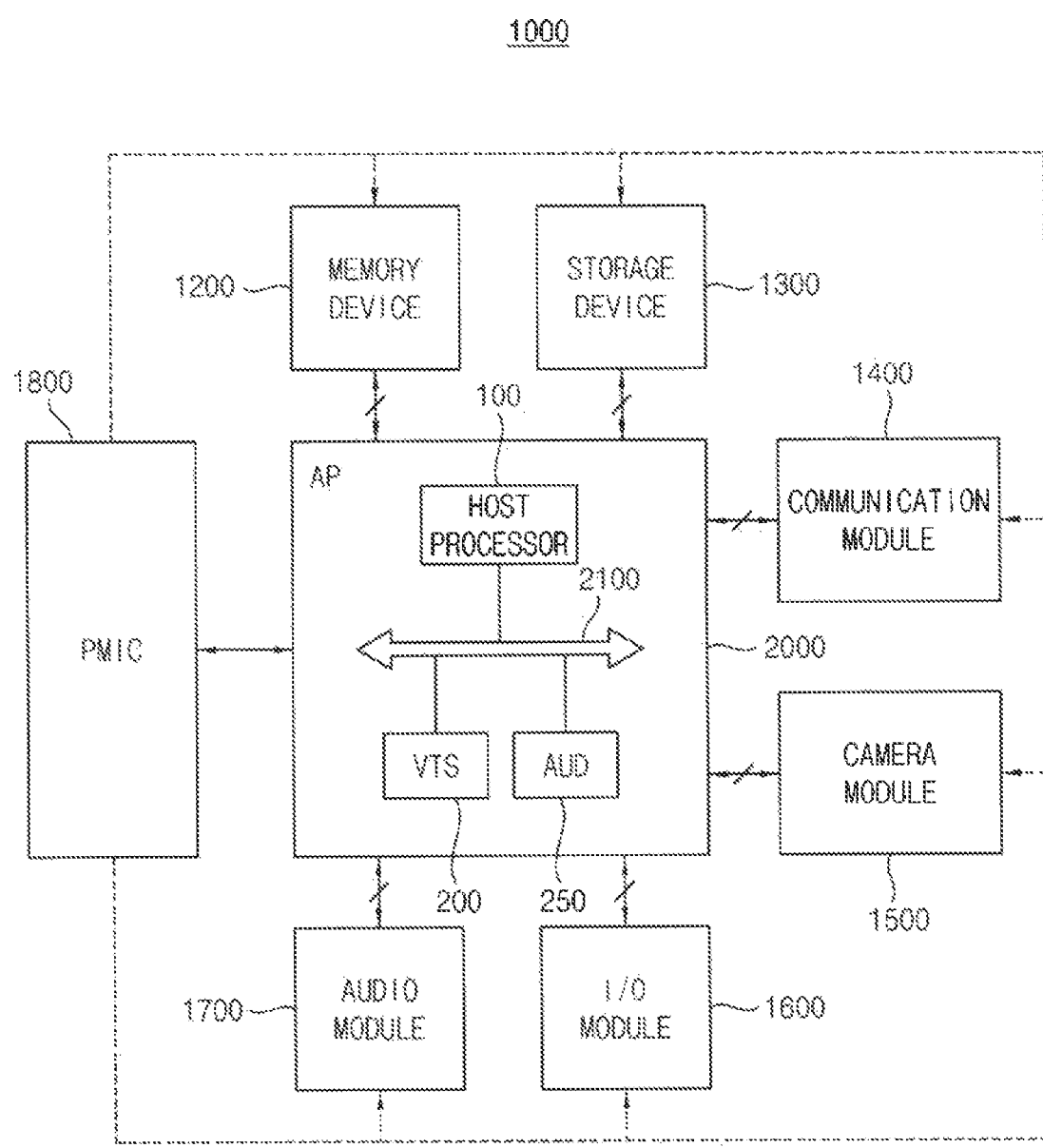
FIG. 2A is a block diagram illustrating an electronic device according to example embodiments.

Various example embodiments will be described more fully hereinafter with reference to the accompanying drawings, in which some example embodiments are shown. In the drawings, like numerals refer to like elements throughout. The repeated descriptions may be omitted.

The application processor, the electronic device including the application processor and the method of operating the application processor according to example embodiments may perform the voice trigger operation with low power and high efficiency by integrating the voice trigger system in the application processor. The on-chip voice trigger system may perform some operations instead of a host processor in the application processor to reduce the power consumption and enhance the performance of the electronic device. In addition, the audio replay and the echo cancellation may be performed with low power and performance of the voice trigger operation may be enhanced by supporting the data communication between the voice trigger system and the audio subsystem using the mail box module.

FIG. 1 is a flow chart illustrating a method of operating an application processor according to example embodiments.

Referring to FIG. 1, in an application processor in which a host processor, a voice trigger system, an audio subsystem, and a system bus electrically connecting the host processor, the voice trigger system and the audio subsystem are integrated as a single semiconductor chip, a voice trigger operation is performed by the voice trigger system based on a trigger input signal provided through a trigger interface to issue a trigger event (S100).

Audio streams that are replayed or recorded through an audio interface are processed by the audio subsystem (S200). The audio subsystem may further support the transfer of the audio streams between the audio interface and a memory device.

The voice trigger operation in this disclosure may indicate an operation to monitor whether the trigger input signal includes a particular trigger sound and issue a trigger event such as an interrupt signal to initiate a voice recognition mode or a voice-based intelligent interface when the trigger sound is detected. The initiation of the voice recognition mode may include launching the host processor and/or the system bus into an active mode. In other words, to reduce power consumption, the voice trigger operation may be performed during a sleep mode (e.g., while the system bus and the host processor are disabled and only the voice trigger system is enabled), and the system bus and the host processor may enter or wake up into the active mode when the trigger event is issued to initiate the voice recognition mode.

In some example embodiments, the trigger sound may include a word and/or a phrase of a human voice. In other example embodiments, the trigger sound may include sounds other than the human voice such as a whistle, a sound of hand clapping, a siren, a sound of collision, a sound wave of a particular frequency range, etc. In this disclosure, the user voice information may correspond to the trigger sound described above.

While the audio replay is performed through the audio interface, an echo cancellation is performed with respect to microphone data received from a microphone to generate compensated data using the direct bus (S300). For example, the audio replay may be performed through the audio interface during a barge-in condition, and the echo cancellation may be performed with respect to the microphone data received from the microphone to generate the compensated data. The echo cancellation will be described with reference to FIG. 4.

The voice trigger operation is performed by the voice trigger system based on the compensated data (S400).

The application processor, the electronic device including the application processor and the method of operating the application processor according to example embodiments may perform the voice trigger operation with low power and high efficiency by integrating the voice trigger system in the application processor. In addition, the audio replay may be performed with low power and accuracy (e.g., a recognition rate) of the voice trigger operation may be enhanced.

FIG. 2A is a block diagram illustrating an electronic device according to example embodiments.

Referring to FIG. 2A, an electronic device 1000 includes an application processor AP 2000, a memory device 1200, a storage device 1300, a plurality of functional modules, including a communication module 1400, a camera module 1500, an input/output (I/O) module 1600 and an audio module 1700, and a power management integrated circuit PMIC 1800.

The application processor 2000 controls overall operations of the electronic device 1000. For example, the application processor 2000 may control the memory device 1200, the storage device 1300 and the plurality of functional modules 1400, 1500, 1600 and 1700. The application processor 2000 may be a system on chip (SoC).

The application processor 2000 may include a system bus 2100, a host processor 100 (also called a central processing unit (CPU)), a voice trigger system VTS 200 and an audio processing system AUD 250, which are electrically connected to the system bus 2100.

The voice trigger system 200 may be electrically connected to the system bus 2100, perform a voice trigger operation and issue a trigger event based on a trigger input signal that is provided through a trigger interface. The audio processing system 240 may include an audio subsystem and may further include a sensor hub as will be described below. The audio subsystem may be electrically connected to the system bus 2100 to process audio streams that are replayed or recorded through an audio interface. In addition, the audio subsystem may further support the transfer of the audio streams between the audio interface and the memory device 1200. Example embodiments of the voice trigger system 200 and the audio processing system 250 will be described below with reference to FIGS. 3 through 17B.

The memory device 1200 and the storage device 1300 may store data for operations of the electronic device 1000. The memory device 1200 may include a volatile memory device, such as a dynamic random access memory (DRAM), a static random access memory (SRAM), a mobile DRAM, etc. The storage device 1300 may include a nonvolatile memory device, such as an erasable programmable read-only memory (EPROM), an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc. In some example embodiments, the storage device 1300 may further include an embedded multimedia card (eMMC), a universal flash storage (UFS), a solid state drive (SSD), a hard disk drive (HDD), a CD-ROM, etc.

The functional modules 1400, 1500, 1600 and 1700 may perform various functions of the electronic device 1000. For example, the electronic device 1000 may include a communication module 1400 that performs a communication function (e.g., a code division multiple access (CDMA) module, a long term evolution (LTE) module, a radio frequency (RF) module, an ultra-wideband (UWB) module, a wireless local area network (WLAN) module, a worldwide interoperability for a microwave access (WIMAX) module, etc.), the camera module 1500 that performs a camera function, the input-output (I/O) module 1600 including a display module that performs a display function and a touch panel module that performs a touch sensing function, and the audio module 1700 including a microphone (MIC) module, a speaker module, etc. that performs input-output of audio signals. In some example embodiments, the electronic device 1000 may further include a global positioning system (GPS) module, a gyroscope module, etc. However, the functional modules 1400, 1500, 1600 and 1700 in the electronic device 1000 are not limited thereto.

The power management integrated circuit 1800 may provide an operating voltage to the application processor 2000, the memory device 1200, the storage device 1300 and the functional modules 1400, 1500, 1600 and 1700.

Figure 2B:
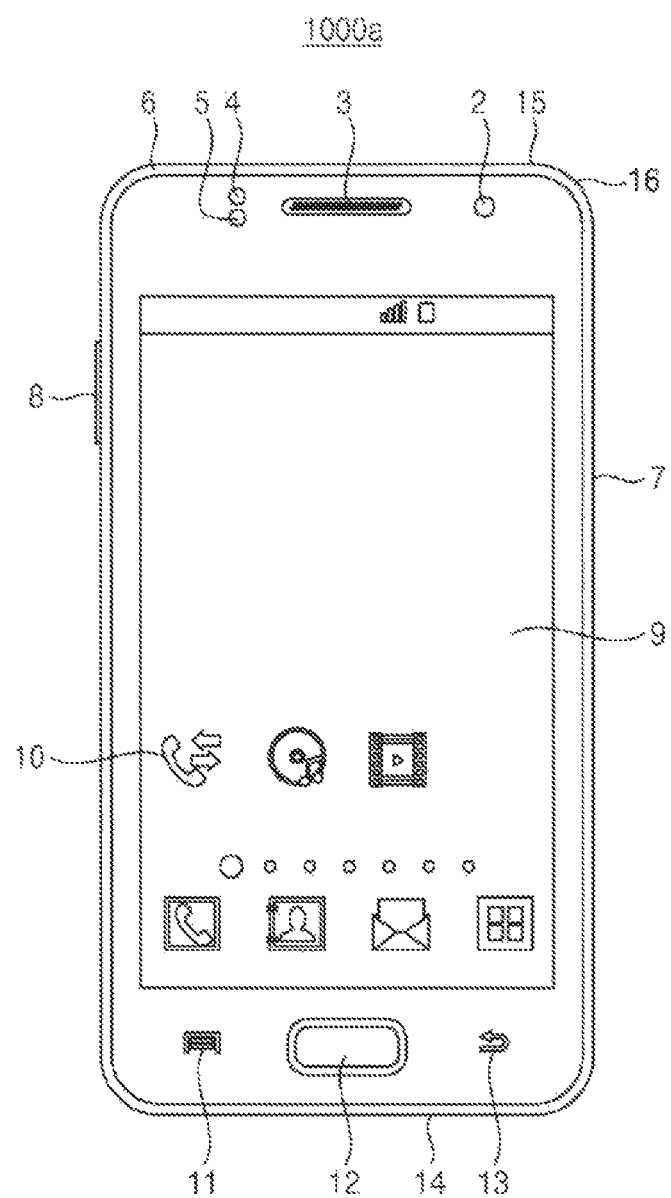
FIG. 2B is an example implementation of the electronic device of FIG. 2A.

FIG. 2B is an example implementation of the electronic device of FIG. 2A.

The electronic device 1000 of FIG. 2A may be a device, such as a desktop computer, a laptop computer, a cellular phone, a smart phone, an MP3 player, a personal digital assistant (PDA), a portable multimedia player (PMP), a digital television, a digital camera, a server computer, a workstation, a set-top box, a portable game console, a navigation system, a wearable device, an internet of things (IoT) device, an internet of everything (IoE) device, an e-book, a virtual reality (VR) device, an augmented reality (AR) device, etc. The electronic device 1000 may typically be operated in response to direct user input, but may also be used to communicate with other devices via the Internet or other network systems. FIG. 2B illustrates a cellular phone or a smart phone including a touch screen as an example of the electronic device 1000 of FIG. 2A.

Referring to FIG. 2B, an electronic device 1000a includes a front camera 2, a speaker 3, a proximity sensor 4, a luminance sensor 5, a universal serial bus (USB) interface 6, a power button 7, a volume button 8, a display and touch screen 9, icons 10, a menu button 11, a home button 12, a back button 13, a microphone 14, an audio output interface 15, and an antenna 16.

The front camera 2 may face in a direction in which the display and touch screen 9 and is used for a video call or video or photo shooting. The speaker 3 may output audio data when a user plays multimedia data by touching the display and touch screen 9 on one of the icons 10 or inputting a signal by speech, talks with another user over a public switched telephone network, or plays an operation sound of the electronic device 1000a or a notification sound. The proximity sensor 4 may control on or off of the display and touch screen 9 in order to save power and prevent miss-operation when a user holds the electronic device 1000a up to an ear for telephone conversation. The luminance sensor 5 may control the operations of the display and touch screen 9 and the front camera 2 according to the quantity of incident light from the surroundings of the electronic device 1000a. The USB interface 6 may be an input/output interface for data communication with external devices and power supply.

The power button 7 may turn on or off the power of the electronic device 1000a or may turn on or off the display and touch screen 9. The volume button 8 may control the audio output of the speaker 3. The icons 10 corresponding to different functions may be displayed on the display and touch screen 9. For example, a user may touch an icon 10 corresponding to playback of multimedia data.

The menu button 11 may allow a user to browse a menu including icons and settings. The home button 12 may allow a home screen to appear for multi-working mode even while the electronic device 1 is performing a certain operation on the display and touch screen 9. The back button 13 may cancel an operation which is currently being performed by the electronic device 1000a and returns a user to a previous screen.

The microphone 14 may be an input-output (I/O) interface for voice calls or voice input signals. The audio output interface 15, e.g., an earphone jack, may be for audio output of multimedia data which is being played. Although not shown, audio output and microphone input may be interfaced through a device supporting Bluetooth. The antenna 16 may be used to receive digital media broadcasting service. The elements of the electronic device 1000a may be embodied in various ways realizable to those of ordinary skill in the art. Some of the elements in FIG. 2B may be omitted or replaced with other elements.

Figure 3:
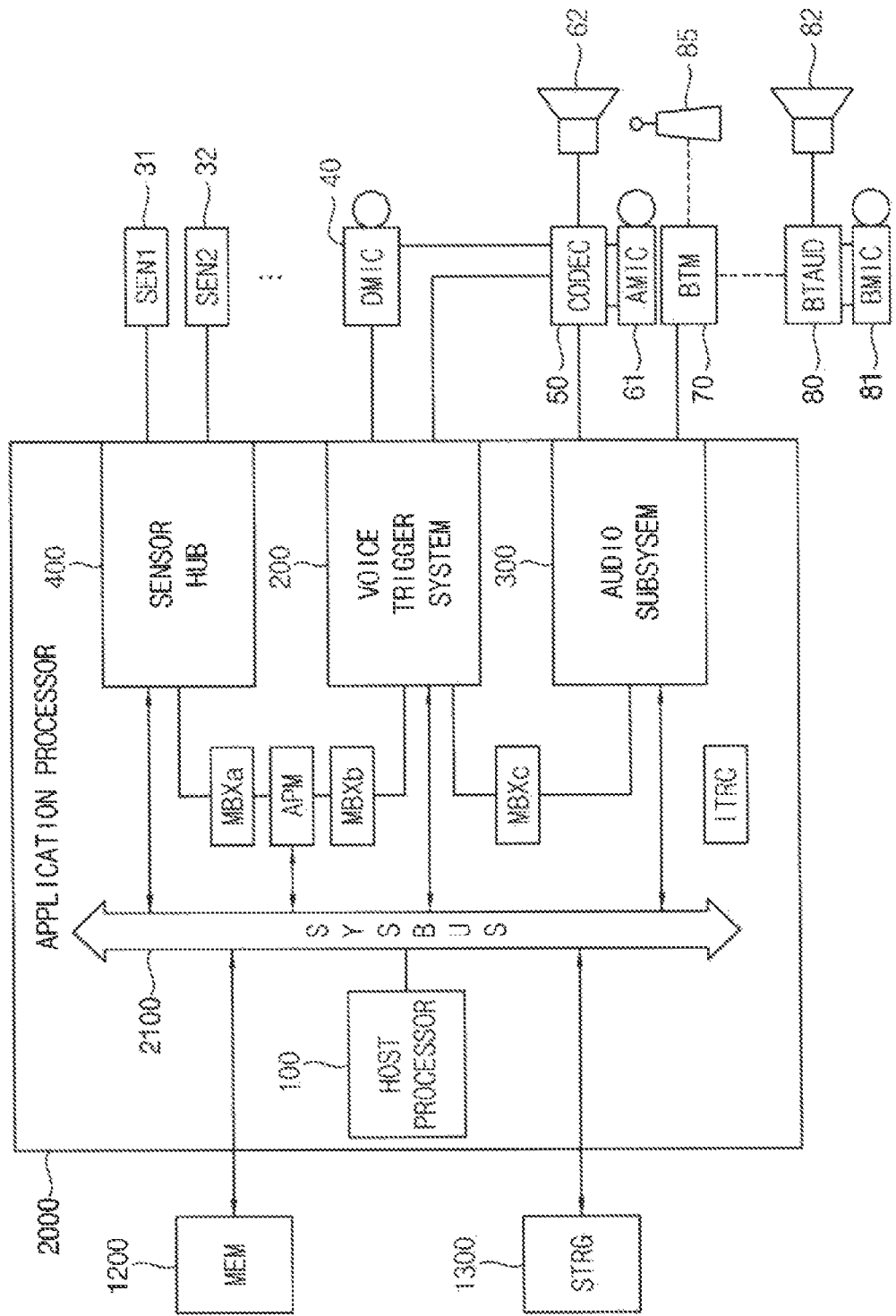
FIG. 3 is a block diagram illustrating an application processor according to example embodiments.

FIG. 3 is a block diagram illustrating an application processor according to example embodiments.

Referring to FIG. 3, an application processor 2000 may include a system bus SYSBUS 2100, a host processor 100, a voice trigger system 200, an audio subsystem 300 and a sensor hub 400. The audio subsystem 300 and the sensor hub 400 may be included in the audio processing system 250 in FIG. 2A. According to example embodiments, the application processor 2000 may further include an active power manager APM, mail box modules MBXa, MBXb and MBXc, and an interrupt controller ITRC.

The system bus 2100 may be referred to as an interconnect device or a backbone. The system bus 2100 may include a higher-layer bus, a lower-layer bus and a bridge connecting them. For example, the system bus 2100 may include various buses such as an advanced extensible interface (AXI), an advanced high-performance bus (AHB), an advanced peripheral bus (APB), etc. and at least one bridge connecting the advanced extensible interface (AXI), the advanced high-performance bus (AHB), the advanced peripheral bus (APB), etc. The host processor 100 may access external devices such as a memory device 1200 and/or a storage device 1300 through the system bus 2100. In addition, the host processor 100 may communicate with the voice trigger system 200, the audio subsystem 300 and the sensor hub 400 through the system bus 2100.

Although one interrupt controller ITRC is illustrated in FIG. 3 for convenience of illustration, the interrupt controller ITRC may include at least one general interrupt controller (GIC), at least one vectored interrupt controller (VIC), etc. For example, the interrupt controller ITRC may be implemented as a programmable interrupt controller (PIC). The programmable interrupt controller may be implemented with multiple layers having a priority system represented by vectors. The programmable interrupt controller may receive an interrupt signal from peripheral devices, determine priorities of the received interrupt signal and issue an interrupt signal with a pointer address to a processor or a controller.

The active power manager APM may manage power of the application processor 2000. The active power manager APM may manage power supplied to respective regions or function blocks of the application processor 2000. The mail box modules MBXa, MBXb and MBXc may support a synchronization of data communication between the elements in the application processor 2000 or data communication between the application processor 2000 and external devices. The mail box modules MBXa, MBXb and MBXc will be described below with reference to FIG. 6.

The voice trigger system 200 is electrically connected to the system bus 2100. The voice trigger system 200 performs a voice trigger operation and issues a trigger event based on a trigger input signal that is provided through a trigger interface. In some example embodiments, the voice trigger system 200 may receive the trigger input signal from a digital microphone DMIC 40 and/or an audio codec (coder and decoder) CODEC 50. In other words, the trigger interface of the voice trigger system 200 may be connected directly to the digital microphone 40 and the audio codec 50. The audio codec 50 may perform encoding and decoding (or analog-to-digital conversion (ADC) and digital-to-analog conversion (DAC)) of an audio signal received from the digital microphone 40 and/or an analog microphone AMIC 61 and an audio signal output to a speaker 62. The digital microphone 40 may be an on-board microphone that is mounted with the application processor 2000 on a board of the electronic device. The analog microphone 61 and the speaker 62 may be devices attached and detachable from terminals of the audio codec 50.

The audio subsystem 300 is electrically connected to the system bus 2100. The audio subsystem 300 processes audio streams that are replayed or recorded through an audio interface and supports transfer of the audio streams between the memory device 1200 and the audio interface. In some example embodiments, the audio subsystem 300 may exchange the audio streams with the audio codec 50 and/or a Bluetooth module BTM 70. In other words, the audio interface of the audio subsystem 300 may be connected directly to the audio codec 50 and the Bluetooth module 70. The Bluetooth module 70 may be connected to a Bluetooth microphone BMIC 81 and a Bluetooth speaker 82 through a Bluetooth audio module BTAUD 80 to receive the audio signal from the Bluetooth microphone 81 and output the audio signal to the Bluetooth speaker 82. The Bluetooth module 70 may be connected directly to another Bluetooth speaker 85 or another Bluetooth device. Although not illustrated in FIG. 3, the audio subsystem 300 may be connected to a universal serial bus (USB) module to exchange the audio stream with the USB module.

The sensor hub 400 is electrically connected to the system bus. The sensor hub 400 processes signals provided from one or more sensors SEN1 31 and SEN2 32. The sensor hub 400 may measure physical quantities associated with the electronic device and process the physical quantities to detect an operation status of the electronic device and process the detected operation status. For example, the sensors 31 and 32 may include a motion sensor, a gyro sensor, an atmospheric pressure sensor, a magnetic sensor, an accelerometer, a grip sensor, a proximity sensor, a biometric sensor, a temperature/humidity sensor, an illumination sensor, and an ultra violet (UV) sensor, an electrical-nose (E-nose) sensor, an electromyography (EMG) sensor, an electroencephalogram (EEG) sensor, an electrocardiogram (ECG) sensor, an infrared (IR) sensor, an iris sensor, and/or a finger print sensor.

In some example embodiments, as illustrated in FIG. 3, all of the system bus 2100, the voice trigger system 200, the audio subsystem 300 and the sensor hub 400 may be integrated in a single semiconductor chip forming the application processor 2000. In other example embodiments, the system bus 2100, the voice trigger system 200 and the audio subsystem 300 may be integrated in a single chip and the sensor hub 400 may be disposed external to the application processor 2000. However, in either case, the voice trigger system 200 is provided on the application processor 2000 and thus, the application processor, the electronic device including the application processor and the method of operating the application processor according to example embodiments may perform the voice trigger operation with low power and high efficiency by integrating the voice trigger system in the application processor.

Figure 4:
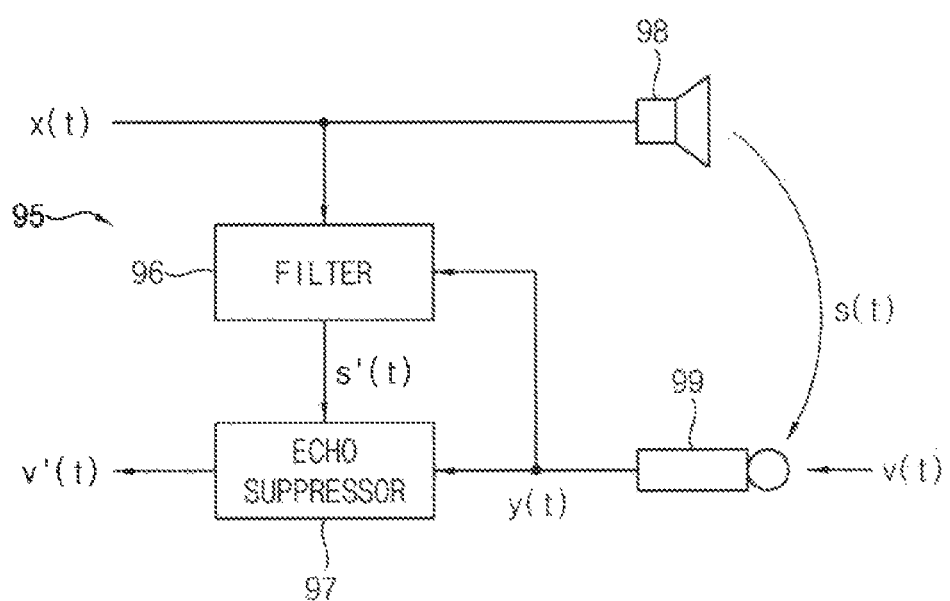
FIG. 4 is a block diagram illustrating an echo canceller included in an application processor according to example embodiments.

FIG. 4 is a block diagram illustrating an echo canceller included in an application processor according to example embodiments.

Referring to FIG. 4, an echo canceller 95 may include a filter 96 and an echo suppressor 97.

An audio output signal x(t) provided from the audio subsystem 300 may output from a speaker 98 and output to a user. A microphone 99 may output an audio input signal y(t). Although not shown, a digital-to-analog conversion (DAC) may be applied to the audio output signal x(t) (e.g., a digital signal) before playout from the speaker 98, and an analog-to-digital conversion (ADC) may be applied to a signal captured by the microphone 99 to arrive at the audio input signal y(t) (e.g., a digital signal) to the echo suppressor 97.

The audio input signal y(t) from by the microphone 99 may include a near-end signal v(t) and an echo signal s(t). The near-end signal v(t) may be referred to as a desired signal or primary signal that the user intends for the microphone 99 to receive. The echo signal s(t) may include an echo component resulting from audio signals outputted from the speaker 98. Although not shown, the audio input signal y(t) may further include noise. The echo component and the noise may act as interferences for the near-end signal v(t), and thus it is advantageous to cancel or remove the echo component and the noise.

In some example embodiments, at least one of various algorithms such as doubletalk detection, step-size control, etc. may be used to perform the echo cancellation.

The filter 96 may estimate the echo signal s(t) included in the audio input signal y(t) based on the audio output signal x(t) and the audio input signal y(t) to generate an estimated echo signal s'(t). In other words, the filter 96 may model the echo component in the audio input signal y(t) and an echo path causing the echo component, and estimate how the echo path changes the desired audio output signal x(t) to an undesired echo component in the audio input signal y(t). The audio output signal x(t) may be used as a reference signal.

The echo path describes the effects of the acoustic paths travelled by a far-end signal from the speaker 98 to the microphone 99. The far-end signal may travel directly from the speaker 98 to the microphone 99, or far-end signal may be reflected from various surfaces in an environment of a near-end terminal. The echo path traversed by the far-end signal output from the speaker 98 may be regarded as a system having a frequency and a phase response which may vary over time.

In some example embodiments, the echo path may be modeled based on at least one of various linear filters such as a finite impulse response (FIR) filter, an infinite impulse response (IIR) filter, etc. For example, the estimate of the echo path may be a vector having (N+1) values where N is a natural number, and the filter 96 may be implemented as an N-th order filter which has a finite length (in time).

In some example embodiments, the estimate of the echo path may not be explicitly calculated, but may be represented by means of filter coefficients obtained from at least one of various stochastic gradient algorithms such as Least Mean Squares (LMS), Normalized Least Mean Squares (NLMS), Fast Affine Projection (FAP) and Recursive Least Squares (RLS), etc.

In some example embodiments, the estimate of the echo path may be continuously updated in real time.

The echo suppressor 97 may generate an estimated near-end signal v'(t) based on the estimated echo signal s'(t) and the audio input signal y(t). For example, the echo suppressor 97 may apply echo suppression to the audio input signal y(t) based on the estimated echo signal s'(t) to generate the estimated near-end signal v'(t), thereby suppressing the echo in the received audio signal. The estimated near-end signal v'(t) may be closer to the near-end signal v(t) as the echo path is more precisely estimated. That is, as the precision of the estimation of the echo path improves, the estimated near-end signal v'(t) becomes a closer approximation of the near-end signal v(t).

In some example embodiments, the echo suppressor 97 may be implemented as an echo subtractor. For example, the echo subtractor may subtract the estimated echo signal s'(t) from the audio input signal y(t) to generate the estimated near-end signal v'(t).

According to example embodiments, the elements in the echo canceller 95 may be implemented with various configurations, some elements in the echo canceller 95 may be omitted or replaced with other elements, and some elements may be added to the echo canceller 95. According to example embodiments, at least a part of the echo canceller 95 may be implemented as hardware such as a circuit, or as instructions and/or program routines (e.g., a software program) executed by one or more processors.

Figure 5:
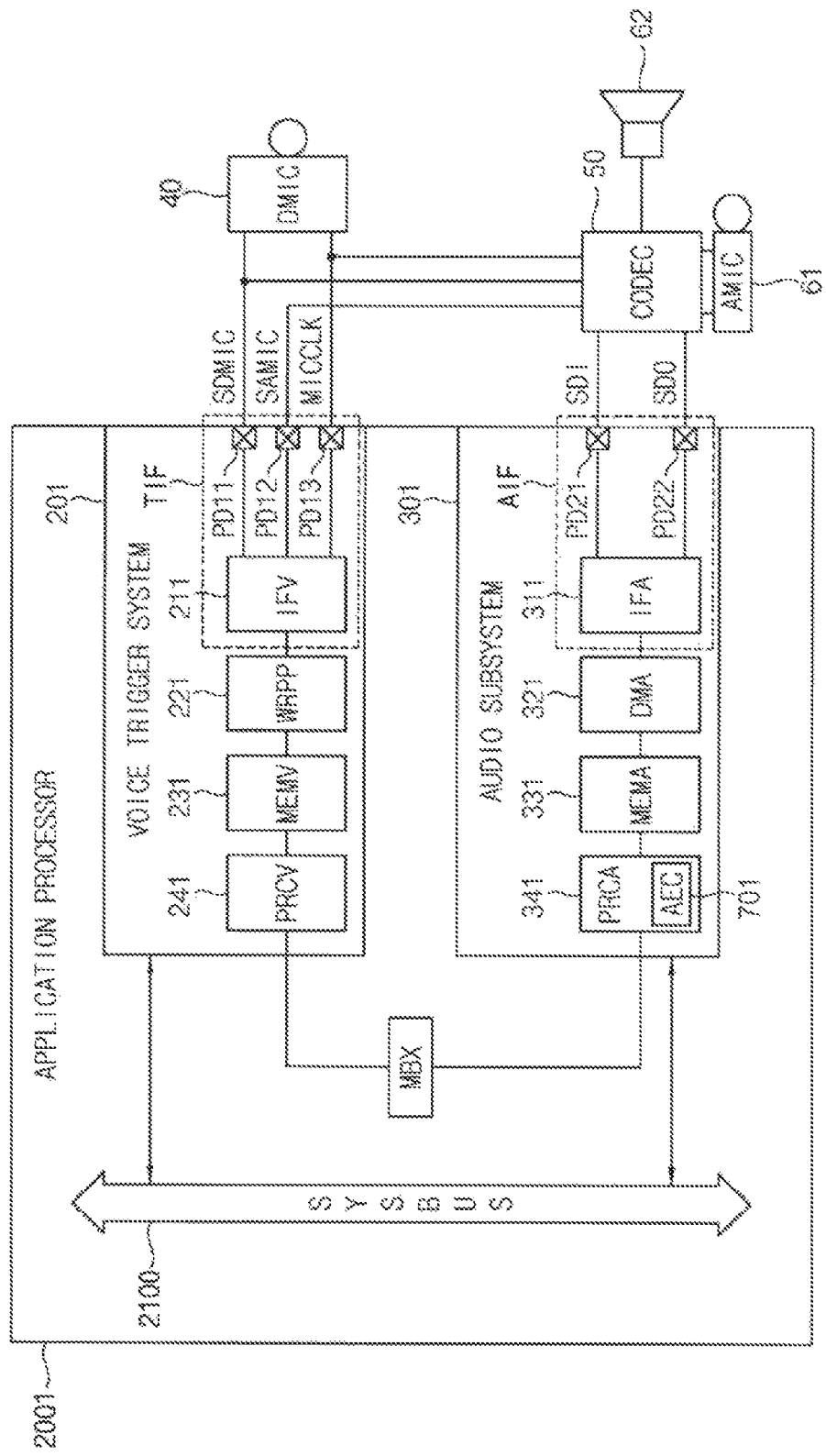
FIG. 5 is a block diagram illustrating an example connection of a voice trigger system and an audio subsystem in an application processor according to example embodiments.

FIG. 5 is a block diagram illustrating an example connection of a voice trigger system and an audio subsystem in an application processor according to example embodiments. The host processor 100 and other elements of FIG. 3 are present but omitted in FIG. 5 for convenience of illustration.

Referring to FIG. 5, an application processor 2001 may include a system bus SYSBUS 2100, a voice trigger system 201, an audio subsystem 301, and a mail box module MBX. The audio subsystem 301 may be included in the audio processing system 250 in FIG. 2A.

The voice trigger system 201 is electrically connected to the system bus 2100. The voice trigger system 201 performs a voice trigger operation based on a mic trigger input signal SDMIC and/or a codec trigger input signal SAMIC that are provided through a trigger interface TIF. The voice trigger system 201 may receive the mic trigger input signal SDMIC from a digital microphone DMIC 40 and/or the codec trigger input signal SAMIC from an audio codec (coder and decoder) CODEC 50. A microphone clock signal MICCLK may be transferred between the voice trigger system 201, the digital microphone 40 and the audio codec 50 for a synchronization of a signal transfer. The mic and codec trigger input signals SDMIC and SAMIC and the microphone clock signal MICCLK may be transferred through pads PD11, PD12 and PD13. The pads PD11, PD12 and PD13 may be implemented such that the used pad may be prevented from being interfered with the other unused pads.

The audio subsystem 301 is electrically connected to the system bus 2100. The audio subsystem 301 processes audio streams that are replayed or recorded through an audio interface AIF and supports transfer of the audio streams between the memory device 1200 and the audio interface. In some example embodiments, the audio subsystem 301 may exchange the audio streams with the audio codec 50. The audio subsystem 301 may receive an audio input signal SDI through an audio input pad PD21 from the audio codec 50 and transmit an audio output signal SDO through an audio output pad PD22 to the audio codec 50.

The voice trigger system 201 may include a trigger interface circuit IFV 211, a wrapper WRPP 221, a trigger memory MEMV 231 and a trigger processor PRCV 241.

The trigger interface circuit 211 and the pads PD11, PD12 and PD13 may form the trigger interface TIF to sample and convert the mic trigger input signal SDMIC provided from the digital microphone 40 and/or the codec trigger input signal SAMIC provided from the audio codec 50. The wrapper 221 may store data provided from trigger interface circuit 211 in the trigger memory 231. The wrapper 221 may issue an interrupt signal to the trigger processor 241 when a threshold amount of data is stored in the trigger memory 231 so that the trigger processor 241 may perform the voice trigger operation based on data stored in the trigger memory 231.

In some example embodiments, the voice trigger system 201 may receive a pulse density modulation (PDM) signal as the mic and codec trigger input signals SDMIC and SAMIC. The trigger interface circuit 211 may convert the PDM signal to a pulse code modulation (PCM) data. The wrapper 221 may store the PCM data in the trigger memory 231. The wrapper 221 may be implemented with a direct memory access controller.

The audio subsystem 301 may include an audio interface circuit IFA 311, a direct memory access controller DMA 321, an audio memory MEMA 331 and an audio processor PRCA 341.

The audio interface circuit 311 and the audio input and output pads PD21 and PD22 may form the audio interface AIF to transfer the audio streams through the audio input signal SDI and the audio output signal SDO. The audio memory 331 may store data of the audio streams, and the direct memory access controller 321 may control access to the audio memory, that is, data read from the audio memory 331 and data write to the audio memory 331. The audio processor 341 may process data stored in the audio memory 331.

In some example embodiments, the audio processor 341 in the audio subsystem 301 may include an echo canceller AEC 701. The echo canceller 701 may be the echo canceller 95 described with reference to FIG. 4.

In some example embodiments, the audio interface circuit IFA 311 may be compatible with I2S (Inter-IC Sound) or IIS (Integrated Interchip Sound) standard. Although not illustrated in FIG. 5, the audio interface circuit 311 may operate based on clock signals according to the I2S standard. In some example embodiments, the audio interface circuit 311 may be connected directly to the digital microphone 40 and/or the audio codec 50.

In some example embodiments, the application processor 2001 may further include a mail box module MBX configured to support synchronization of a data communication between the voice trigger system 201 and the audio subsystem 301.

It is advantageous to perform an echo cancellation during the audio replay to enhance recognition rate of the voice trigger operation. While the audio replay is performed through the audio interface AIF, the application processor 2001 according to example embodiments may perform the echo cancellation with respect to microphone data received from a microphone (e.g., the digital microphone 40 or the analog microphone 61) to generate compensated data, and the voice trigger system 201 may perform the voice trigger operation based on the compensated data. The echo cancellation may be performed by the echo canceller 701 in the audio subsystem 301.

The application processor 2001 may perform the data communication between the voice trigger system 201 and the audio subsystem 301 using the mail box module MBX through the system bus 2100. As such, while the audio replay is performed through the audio interface AIF, and while the echo cancellation is performed, the host processor 100 and/or the system bus 2100 may maintain a sleep mode and not wake up into an active mode for the voice trigger operation. That is, while audio replay is performed through the audio interface AIR and while echo cancellation is performed, only the audio subsystem 301, components related to the mail box module MBX, and the voice trigger system 201 are in an active mode.

Figure 6:
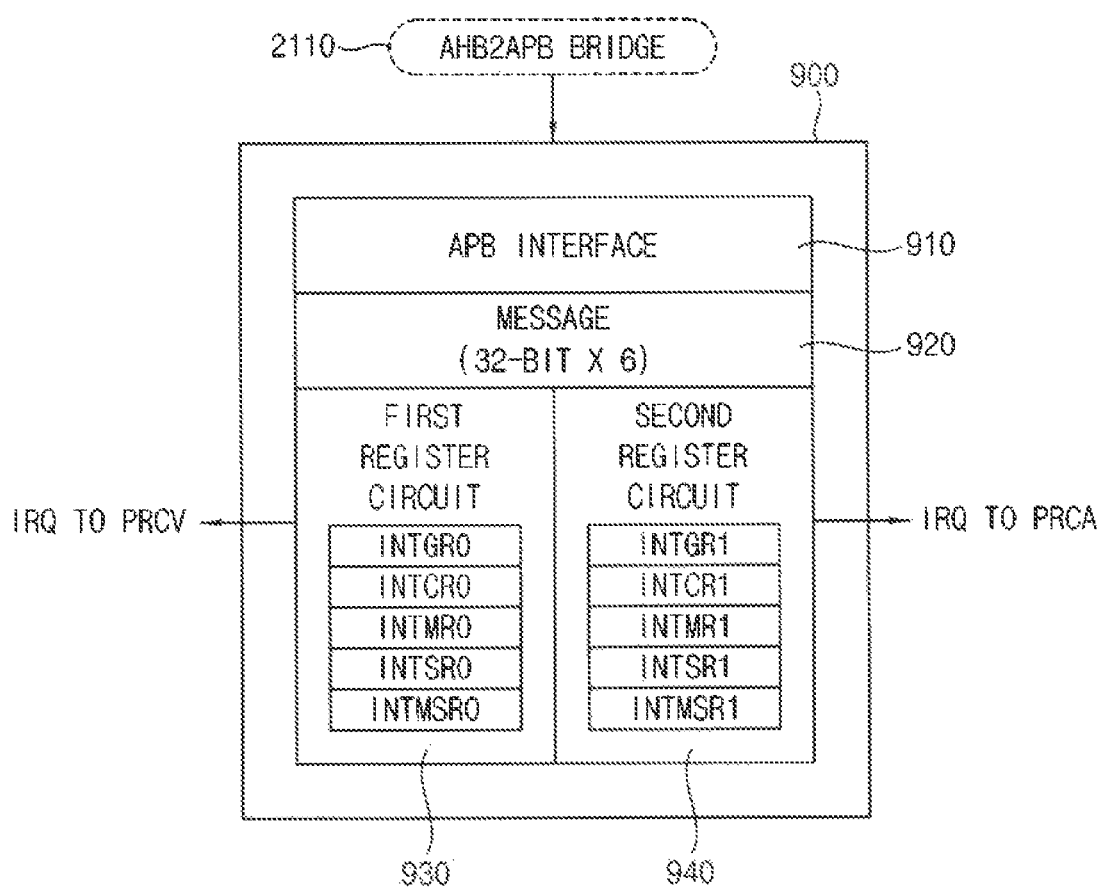
FIG. 6 is a diagram illustrating an example embodiment of a mail box module included in the application processor of FIG. 5.

FIG. 6 is a diagram illustrating an example embodiment of a mail box module included in the application processor of FIG. 5.

Referring to FIG. 6, a mail box module 900 may include an interface APB INTERFACE 910, a message box MESSAGE 920, a first register circuit 930 including a plurality of registers INTGR0, INTCR0, INTMR0, INTSR0 and INTMSR0, and a second register circuit 940 including a plurality of registers INTGR1, INTCR1, INTMR1, INTSR1 and INTMSR1. FIG. 6 illustrates a non-limiting example that the mail box module 900 is connected to an AHB2APB bridge of the system bus 2100 through an APB interface and the message box 920 is implemented with shared registers of 6*32 bits. However, this is only an example and the type of the interface 910, and the number and the bit number of the registers in the message box 920 may be determined variously. The first register circuit 930 may generate an interrupt signal (IRQ TO PRCV) provided to the trigger processor 241 in the voice trigger system 201 and the second register circuit 940 may generate an interrupt signal (IRQ TO PRCA) provided to the audio processor 341 in the audio subsystem 301. The data transmission between the voice trigger system 201 and the audio subsystem 301 may be synchronized using the mail box module 900.

The mail box module 900 may perform bilateral communication by transmitting an interrupt signal after one of the trigger processor 241 and the audio processor 341 writes a message in the message box 920. The synchronization of the data transmission between the voice trigger system 201 and the audio subsystem 301 may be implemented through a polling method, etc.

Figure 7:
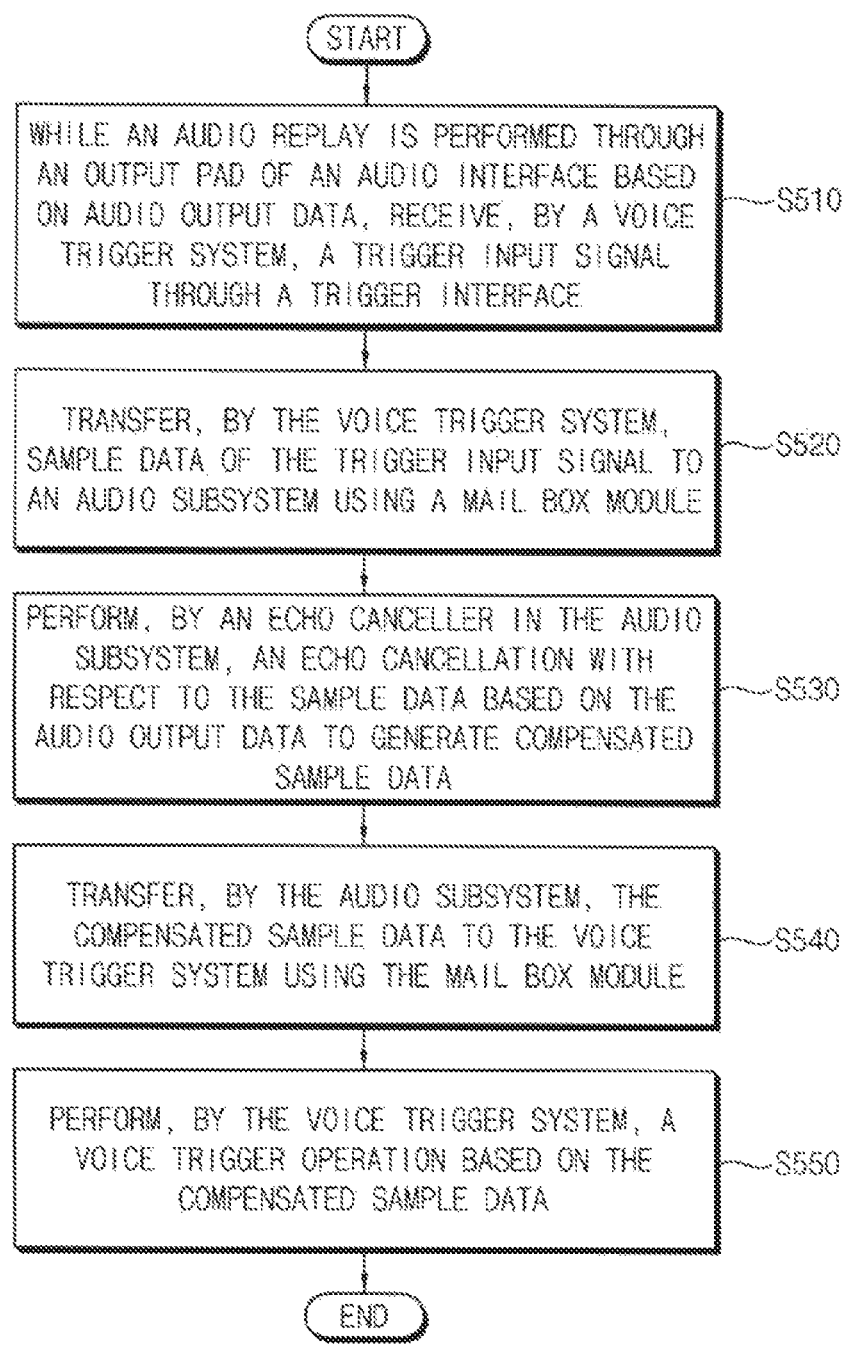
FIG. 7 is a flow chart illustrating a method of operating an application processor according to example embodiments.
Figure 8:
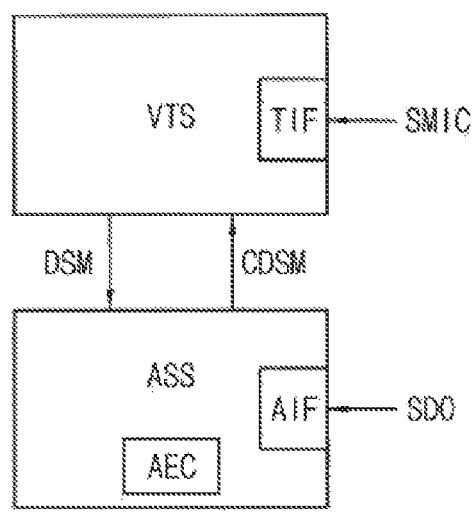
FIG. 8 is a block diagram for describing the method of operating the application processor of FIG. 7.

FIG. 7 is a flow chart illustrating a method of operating an application processor according to example embodiments. FIG. 8 is a block diagram for describing the method of operating the application processor of FIG. 7.

Referring to FIGS. 7 and 8, while an audio replay is performed by an audio subsystem ASS through an output pad of an audio interface AIF based on audio output data of an audio output signal SDO, a voice trigger system VTS may receive a trigger input signal SMIC through a trigger interface TIF (S510).

The voice trigger system VTS may transfer sample data DSM of the trigger input signal SMIC to the audio subsystem ASS using the mail box module MBX (S520). For example, the sample data DSM may be transferred through the system bus 2100 from the voice trigger system VTS to the audio subsystem ASS.

An echo canceller AEC in the audio subsystem ASS may perform an echo cancellation with respect to the sample data DSM based on the audio output data of the audio output signal SDO to generate compensated sample data CDSM (S530). The audio output data may be used as a reference signal, and the sample data DSM may be used as a received signal for the echo cancellation.

The audio subsystem ASS may transfer the compensated sample data CDSM to the voice trigger system VTS using the mail box module MBX (S540). For example, the compensated sample data CDSM may be transferred through the system bus 2100 from the audio subsystem ASS to the voice trigger system VTS.

The voice trigger system VTS may perform a voice trigger operation based on the compensated sample data. CDSM (S550). The voice trigger operation may be performed based on the compensated sample data CDSM to which the echo cancellation is applied, and thus a recognition rate of the voice trigger operation may be enhanced.

Figure 9:
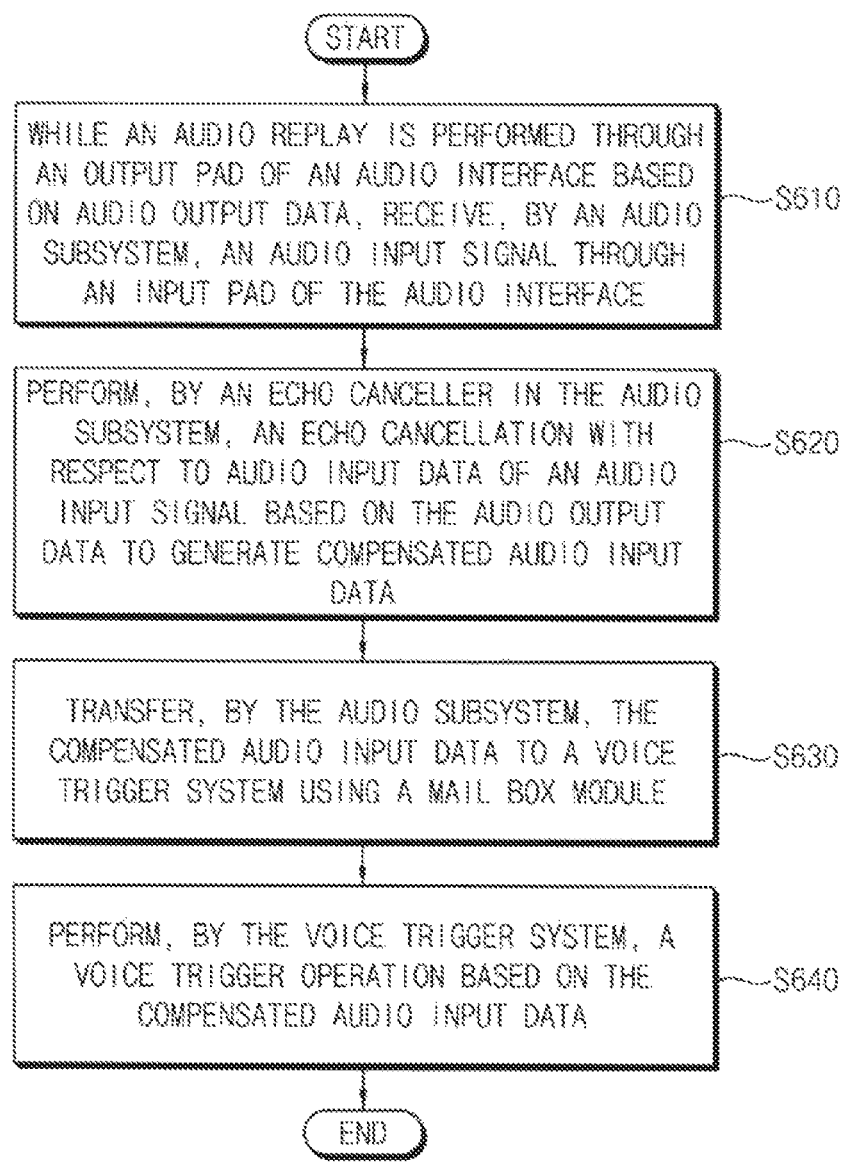
FIG. 9 is a flow chart illustrating a method of operating an application processor according to example embodiments.
Figure 10:
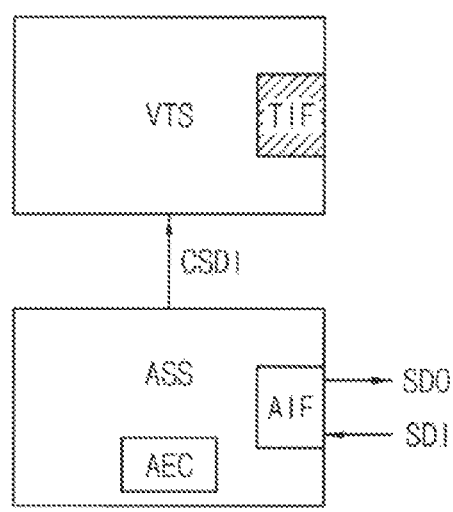
FIG. 10 is a block diagram for describing the method of operating the application processor of FIG. 9.

FIG. 9 is a flow chart illustrating a method of operating an application processor according to example embodiments. FIG. 10 is a block diagram for describing the method of operating the application processor of FIG. 9.

Referring to FIGS. 9 and 10, while an audio replay is performed by an audio subsystem ASS through an output pad of an audio interface AIF based on audio output data of an audio output signal SDO, the audio subsystem ASS may receive an audio input signal SDI through an input pad of the audio interface AIF (S610).

An echo canceller AEC in the audio subsystem ASS may perform an echo cancellation with respect to audio input data of the audio input signal SDI based on the audio output data of the audio output signal SDO to generate compensated audio input data CSDI (S620). The audio output data may be used as a reference signal, and the audio input data may be used as a received signal for the echo cancellation.

The audio subsystem ASS may transfer the compensated audio input data CSDI to the voice trigger system VTS using the mail box module MBX (S630). For example, the compensated audio input data CSDI may be transferred through the system bus 2100 from the audio subsystem ASS to the voice trigger system VTS.

The voice trigger system VTS may perform a voice trigger operation based on the compensated audio input data CSDI (S640). The voice trigger operation may be performed based on the compensated audio input data CSDI to which the echo cancellation is applied, and thus a recognition rate of the voice trigger operation may be enhanced.

In some example embodiments, the trigger interface TIF may be disabled while the audio replay is performed. In other words, the trigger interface TIF may not receive the trigger input signal SMIC, and the voice trigger system VTS may perform the voice trigger operation based on the compensated audio input data CSDI instead of the trigger input signal SMIC.

Figure 11:
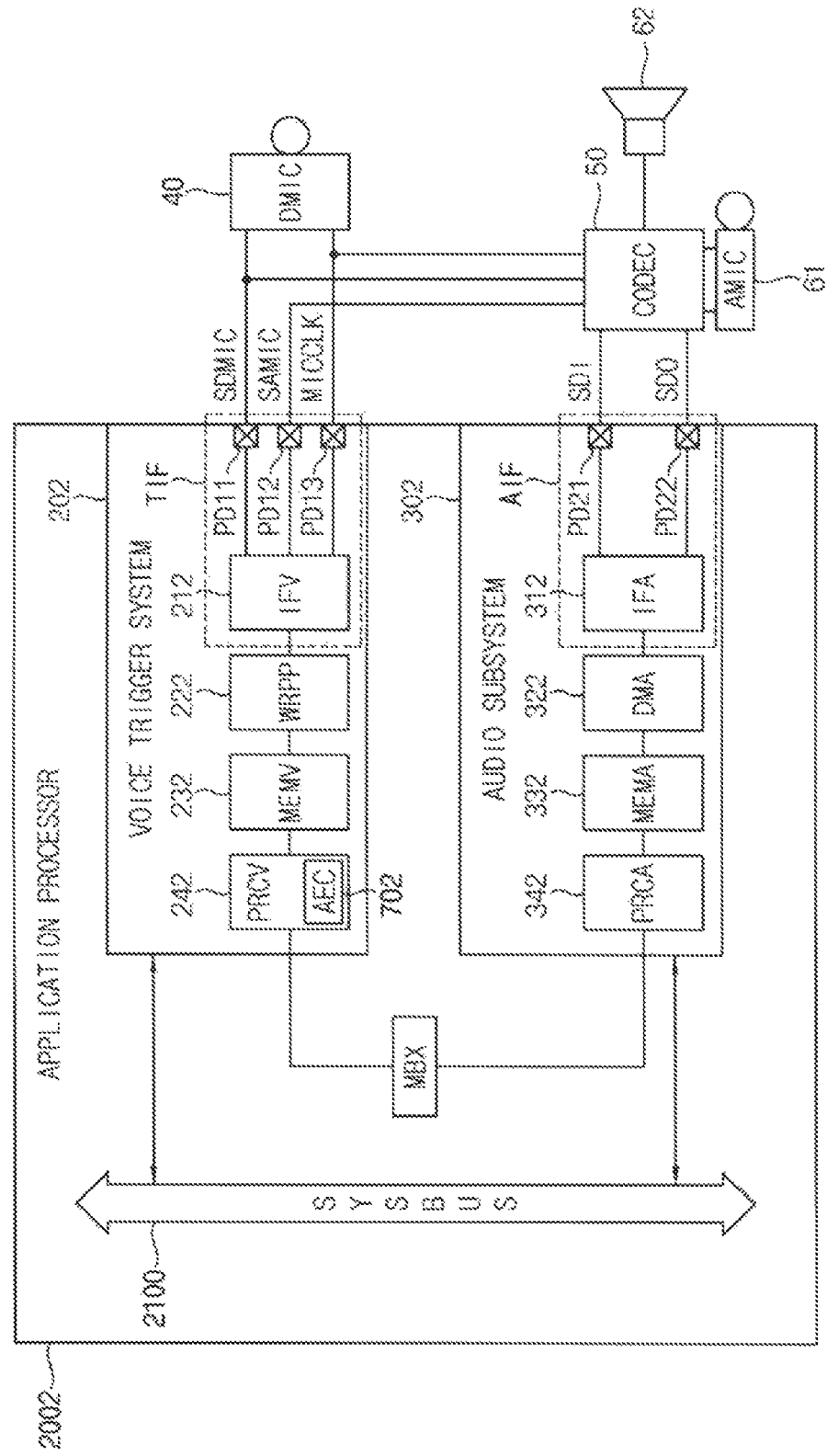
FIG. 11 is a block diagram illustrating an example connection of a voice trigger system and an audio subsystem in an application processor according to example embodiments.

FIG. 11 is a block diagram illustrating an example connection of a voice trigger system and an audio subsystem in an application processor according to example embodiments. The host processor 100 and other elements of FIG. 3 are present but omitted in FIG. 11 for convenience of illustration and the descriptions repeated with FIGS. 3 and 5 may be omitted.

Referring to FIG. 11, an application processor 2002 may include a system bus SYSBUS 2100, a voice trigger system 202, an audio subsystem 302, and a mail box module MBX. The audio subsystem 302 may be included in the audio processing system 250 in FIG. 2A.

The voice trigger system 202 may include a trigger interface circuit IFV 212, a wrapper WRPP 222, a trigger memory MEMV 232 and a trigger processor PRCV 242.

The audio subsystem 302 may include an audio interface circuit IFA 312, a direct memory access controller DMA 322, an audio memory MEMA 332 and an audio processor PRCA 342.

In comparison with the echo canceller 701 included in the audio subsystem 301 of the application processor 2001 of FIG. 5, an echo canceller 702 may be included in the trigger processor 242 in the voice trigger system 202 of the application processor 2002, as shown in the example embodiment of FIG. 11. The echo canceller 702 may be the echo canceller 95 described with reference to FIG. 4. In an example of FIG. 11, an echo cancellation may be performed by the echo canceller 702 in the voice trigger system 202.

Figure 12:
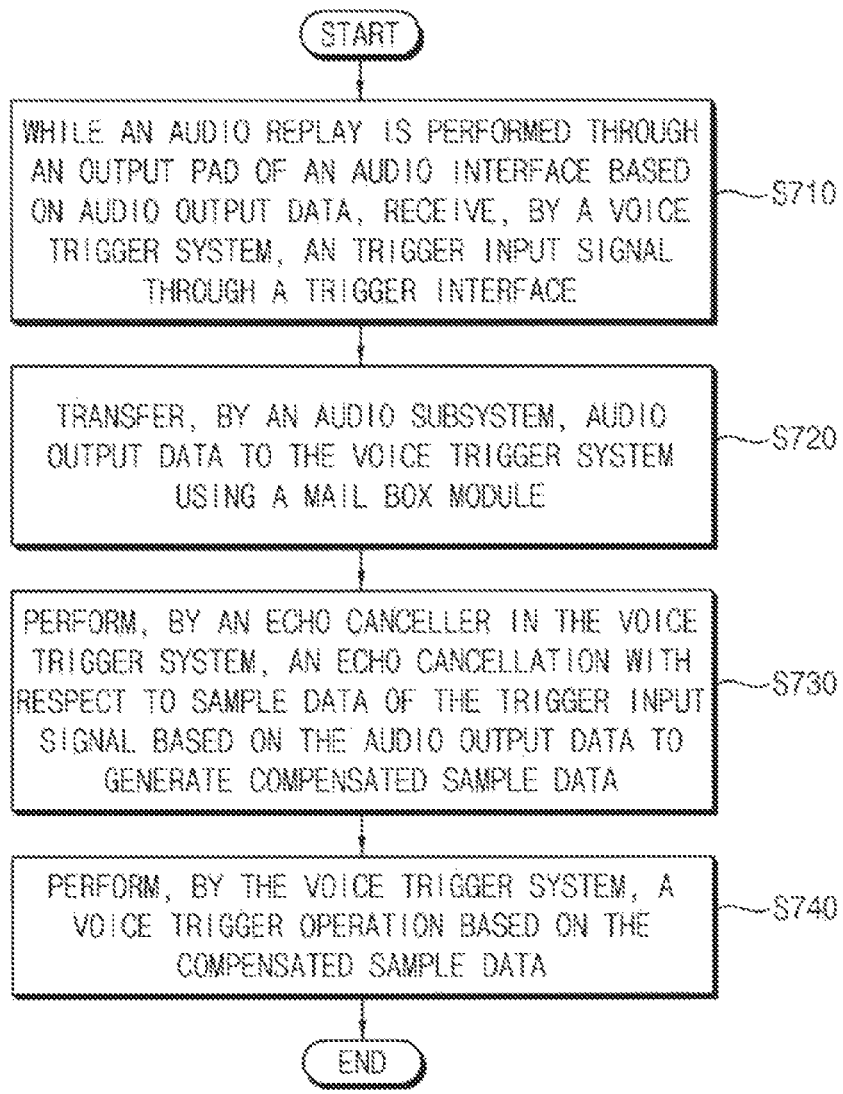
FIG. 12 is a flow chart illustrating a method of operating an application processor according to example embodiments.
Figure 13:
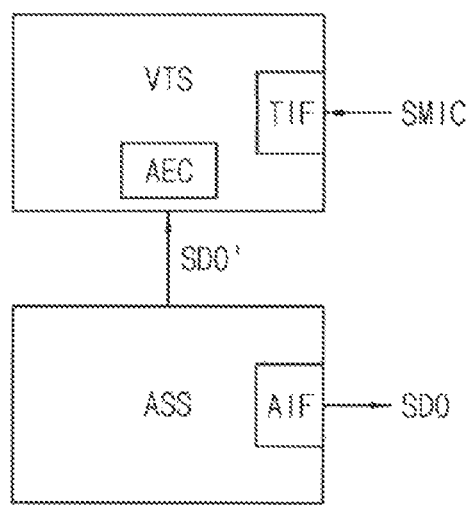
FIG. 13 is a block diagram for describing the method of operating the application processor of FIG. 12.

FIG. 12 is a flow chart illustrating a method of operating an application processor according to example embodiments. FIG. 13 is a block diagram for describing the method of operating the application processor of FIG. 12.

Referring to FIGS. 12 and 13, while an audio replay is performed by an audio subsystem ASS through an output pad of an audio interface AIF based on audio output data SDO' corresponding to an audio output signal SDO, a voice trigger system VTS may receive a trigger input signal SMIC through a trigger interface TIF (S710).

The audio subsystem ASS may transfer the audio output data SDO' to the voice trigger system VTS using the mail box module MBX (S720). For example, the audio output data SDO' may be transferred through the system bus 2100 from the audio subsystem ASS to the voice trigger system VTS.

An echo canceller AEC in the voice trigger system VTS may perform an echo cancellation with respect to sample data of the trigger input signal SMIC based on the audio output data SDO' to generate compensated sample data (S730). The audio output data SDO' may be used as a reference signal, and the sample data may be used as a received signal for the echo cancellation.

The voice trigger system VTS may perform a voice trigger operation based on the compensated sample data (S740). The voice trigger operation may be performed based on the compensated sample data to which the echo cancellation is applied, and thus a recognition rate of the voice trigger operation may be enhanced.

Figure 14:
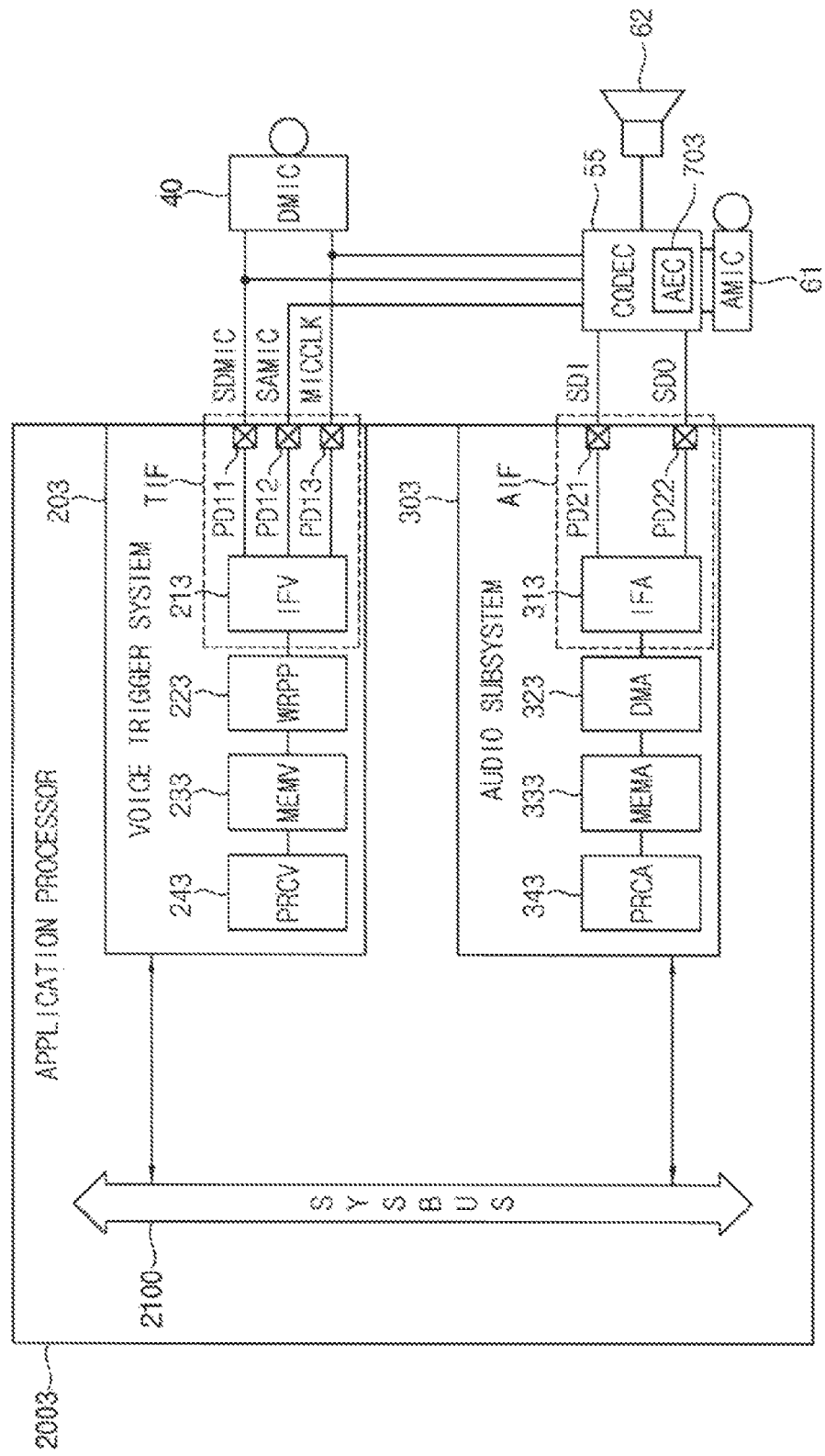
FIG. 14 is a block diagram illustrating an example connection of a voice trigger system and an audio subsystem in an application processor according to example embodiments.

FIG. 14 is a block diagram illustrating an example connection of a voice trigger system and an audio subsystem in an application processor according to example embodiments. The host processor 100 and other elements of FIG. 3 are present but omitted in FIG. 14 for convenience of illustration and the descriptions repeated with FIGS. 3 and 5 may be omitted.

Referring to FIG. 14, an application processor 2003 may include a system bus SYSBUS 2100, a voice trigger system 203, an audio subsystem 303, and a mail box module MBX. The audio subsystem 303 may be included in the audio processing system 250 in FIG. 2A.

The voice trigger system 203 may include a trigger interface circuit IFV 213, a wrapper WRPP 223, a trigger memory MEMV 233 and a trigger processor PRCV 243.

The audio subsystem 303 may include an audio interface circuit IFA 313, a direct memory access controller DMA 323, an audio memory MEMA 333 and an audio processor PRCA 343.

In comparison with the echo canceller 701 included in the audio subsystem 301 of the application processor 2001 of FIG. 5 and the echo canceller 702 included in the voice trigger system 202 of the application processor 2002 of FIG. 11, an echo canceller 703 may be included in an audio codec 55 connected to the trigger interface TIF and the audio interface AIF of the application processor 2003 of FIG. 14. The echo canceller 703 may be the echo canceller 95 described with reference to FIG. 4. In an example of FIG. 14, an echo cancellation may be performed by the echo canceller 703 in the audio codec 55.

Figure 15:
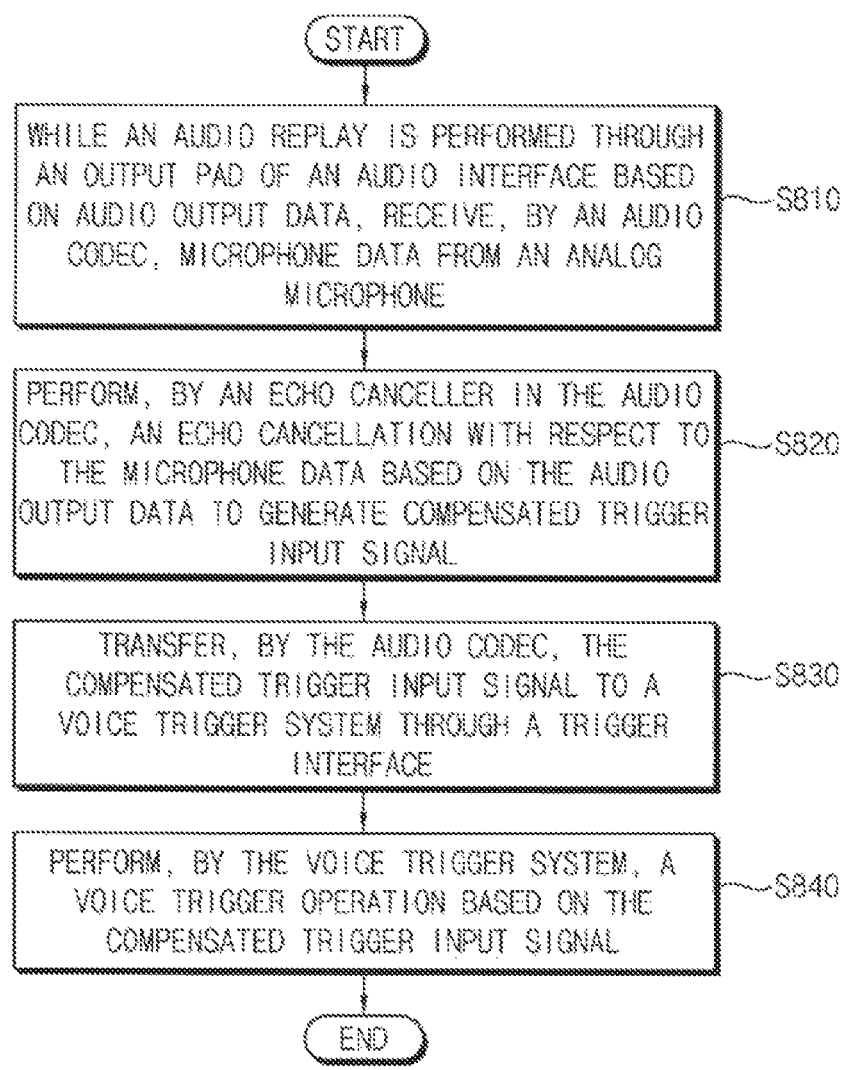
FIG. 15 is a flow chart illustrating a method of operating an application processor according to example embodiments.
Figure 16:
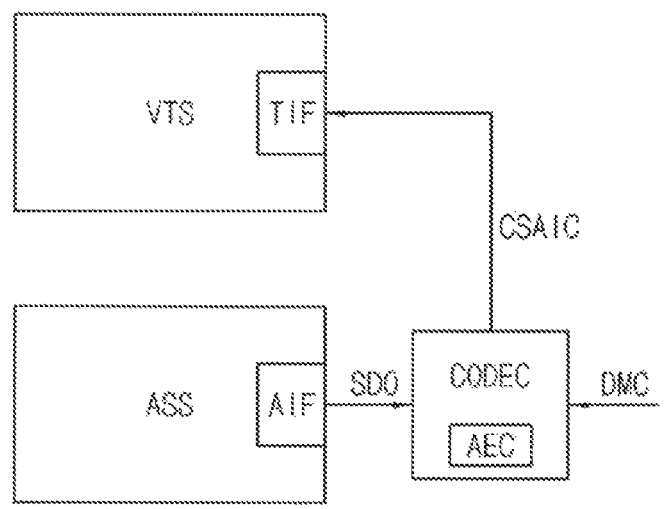
FIG. 16 is a block diagram for describing the method of operating the application processor of FIG. 15.

FIG. 15 is a flow chart illustrating a method of operating an application processor according to example embodiments. FIG. 16 is a block diagram for describing the method of operating the application processor of FIG. 15.

Referring to FIGS. 15 and 16, while an audio replay is performed by an audio subsystem ASS through an output pad of an audio interface AIF based on audio output data of an audio output signal SDO, an audio codec CODEC may receive microphone data DMC from an analog microphone (S810).

An echo canceller AEC in the audio codec CODEC may perform an echo cancellation with respect to the microphone data DMC based on the audio output data to generate compensated trigger input signal CSAIC (S820). The audio output data of the audio output signal SDO may be used as a reference signal, and the microphone data DMC may be used as a received signal for the echo cancellation.

The audio codec CODEC may transfer the compensated trigger input signal CSAIC to a voice trigger system VTS through a trigger interface TIF (S830).

The voice trigger system VTS may perform a voice trigger operation based on the compensated trigger input signal CSAIC (S840). The voice trigger operation may be performed based on the compensated trigger input signal CSAIC to which the echo cancellation is applied, and thus a recognition rate of the voice trigger operation may be enhanced.

In the example of FIG. 16, the compensated trigger input signal CSAIC may be directly transferred to the voice trigger system VTS through the trigger interface TIF, and thus the host processor and/or the system bus 2100 may also maintain the sleep mode and not wake up into the active mode for the voice trigger operation.

Although not shown, the audio codec 50 in FIGS. 5 and 11 or the audio codec 55 in FIG. 14 may be included in the voice trigger system or disposed between the voice trigger system and the audio subsystem, or the audio subsystem may be further connected to the Bluetooth module 70 connected to the Bluetooth microphone BMIC 81 and the Bluetooth speaker 82 or the USB module connected to a USB microphone and a USB speaker, or the audio codec 50 may be replaced with the Bluetooth module 70 and/or the USB module, according to example embodiments.

Figure 17A:
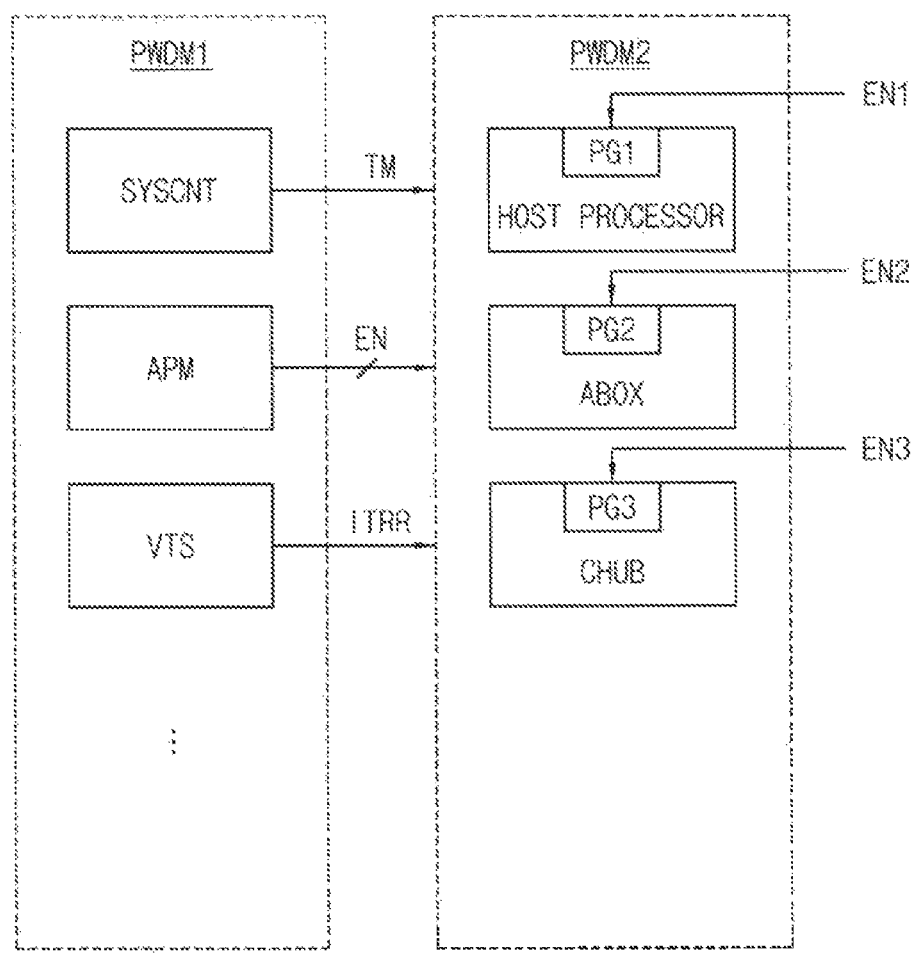
FIGS. 17A and 17B are diagrams for describing power domains of an application processor according to example embodiments.
Figure 17B:
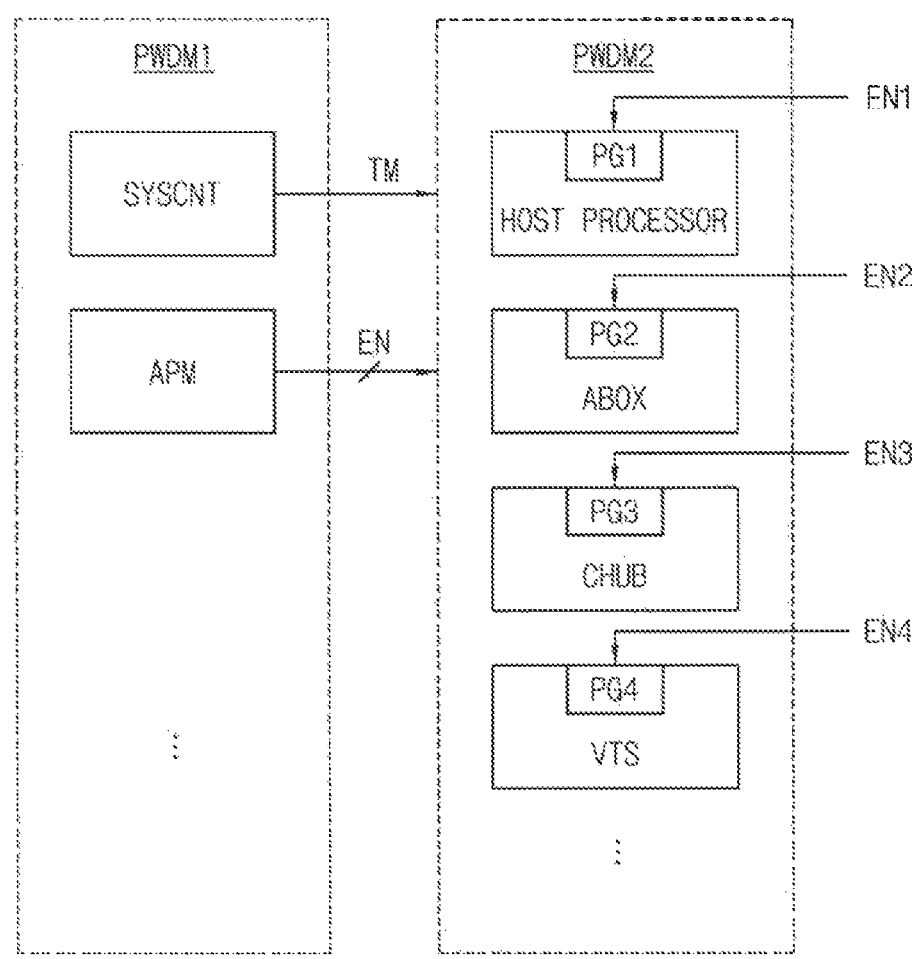

FIGS. 17A and 17B are diagrams for describing power domains of an application processor according to example embodiments.

An application processor may include a plurality of power domains that are independently powered. FIGS. 17A and 17B illustrate a first power domain PWDM1 and a second power domain PWDM2 as an example. The first power domain PWDM1 corresponds to an always-powered domain where power is supplied in both of an active mode and a standby mode (or a sleep mode), and the second power domain PWDM2 corresponds to a power-save domain where power is blocked in the standby mode.

Referring to FIG. 17A, a system counter SYSCNT, an active power manager APM and a voice trigger system VTS may be disposed in the always-powered domain PWDM1. A plurality of hardware blocks such as a host processor CPU, an audio subsystem ABOX, a sensor hub CHUB, etc. may be disposed in the power-save domain PWDM2.

The system counter SYSCNT may generate time information TM and provide the time information TM to internal circuits of the system. The active power manager APM may generate a plurality of power enable signals EN to control power supply, power block, etc. of various elements in the system. The voice trigger system VTS may generate an interrupt signal ITRR representing the trigger event.

In this disclosure, the active mode represents that at least the host processor CPU is enabled and an operating system (OS) runs. The sleep mode or the standby mode represents a power-down mode in which the host processor CPU is disabled.

In comparison with the disposition of FIG. 17A, the voice trigger system VTS may be disposed in the power-save domain PWDM2 as illustrated in FIG. 17B.

As illustrated in FIGS. 17A and 17B, the host processor CPU, the voice trigger system VTS, the audio subsystem ABOX and the sensor hub CHUB may include power gating circuits PG1, PG2, PG3 and PG4, respectively. The power gating circuits PG1~PG4 may supply power selectively in response to power enable signals EN1, EN2, EN3 and EN4. As such, the voice trigger system VTS, the audio subsystem ABOX and the sensor hub CHUB may be power-gated and enabled independently of the host processor CPU. In some example embodiments, the voice trigger system VTS may request the active power manager APM to enable or disable the sensor hub CHUB so that the sensor hub CHUB may be enabled.

The present inventive concept may be applied to any electronic devices and systems supporting the voice trigger function. For example, the present inventive concept may be applied to systems such as a desktop computer, a laptop computer, a cellular phone, a smart phone, an MP3 player, a personal digital assistant (PDA), a portable multimedia player (PMP), a digital television, a digital camera, a server computer, a workstation, a set-top box, a portable game console, a navigation system, a wearable device, an internet of things (IoT) device, an internet of everything (IoE) device, an e-book, a virtual reality (VR) device, an augmented reality (AR) device, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An application processor comprising:
   a system bus;
   a host processor electrically connected to the system bus;
   a voice trigger system electrically connected to the system bus, the voice trigger system being configured to perform a voice trigger operation and issue a trigger event based on a trigger input signal that is provided through a trigger interface;
   an audio subsystem comprising an audio interface and electrically connected to the system bus, the audio subsystem being configured to process audio streams through the audio interface; and
   a mail box module configured to support a synchronization of a data communication between the voice trigger system and the audio subsystem,
   wherein, while an audio replay is performed through the audio interface, the application processor performs an echo cancellation with respect to microphone data received from a microphone to generate compensated data and the voice trigger system performs the voice trigger operation based on the compensated data,
   wherein the audio subsystem includes:
   an echo canceller configured to perform the echo cancellation,
   wherein, while the audio replay is performed through an output pad of the audio interface based on audio output data, the voice trigger system receives the trigger input signal through the trigger interface,
   wherein the voice trigger system transfers sample data of the trigger input signal to the audio subsystem using the mail box module,
   wherein the echo canceller in the audio subsystem performs the echo cancellation with respect to the sample data based on the audio output data to generate compensated sample data, and the audio subsystem transfers the compensated sample data to the voice trigger system using the mail box module, and
   wherein the voice trigger system performs the voice trigger operation based on the compensated sample data.

2. The application processor of claim 1, wherein all of the system bus, the host processor, the voice trigger system and the audio subsystem are integrated in a single semiconductor chip.

3. The application processor of claim 1, wherein, while the audio replay is performed through the audio interface, the host processor maintains a sleep mode and the host processor does not wake up into an active mode for the voice trigger operation.

4. The application processor of claim 1, wherein, while the audio replay is performed through the output pad of the audio interface based on the audio output data, the audio subsystem receives an audio input signal through an input pad of the audio interface.

5. The application processor of claim 4,
wherein the echo canceller in the audio subsystem performs the echo cancellation with respect to audio input data of the audio input signal based on the audio output data to generate compensated audio input data.

6. The application processor of claim 4, wherein the trigger interface is disabled while the audio replay is performed.

7. An electronic device comprising:
at least one audio input-output device; and
an application processor comprising:
  a system bus;
  a host processor electrically connected to the system bus;
  a voice trigger system electrically connected to the system bus, the voice trigger system being configured to perform a voice trigger operation and issue a trigger event based on a trigger input signal that is provided through a trigger interface;
  an audio subsystem comprising an audio interface and electrically connected to the system bus, the audio subsystem being configured to process audio streams through the audio interface; and
  a mail box module configured to support a synchronization of a data communication between the voice trigger system and the audio subsystem,
wherein, while an audio replay is performed through the audio interface, the application processor performs an echo cancellation with respect to microphone data received from a microphone to generate compensated data and the voice trigger system performs the voice trigger operation based on the compensated data,
wherein the audio subsystem includes:
an echo canceller configured to perform the echo cancellation,
wherein, while the audio replay is performed through an output pad of the audio interface based on audio output data, the voice trigger system receives the trigger input signal through the trigger interface,
wherein the voice trigger system transfers sample data of the trigger input signal to the audio subsystem using the mail box module,
wherein the echo canceller in the audio subsystem performs the echo cancellation with respect to the sample data based on the audio output data to generate compensated sample data, and the audio subsystem transfers the compensated sample data to the voice trigger system using the mail box module, and
wherein the voice trigger system performs the voice trigger operation based on the compensated sample data.

8. A method of operating an application processor, comprising:
performing, by a voice trigger system, a voice trigger operation based on a trigger input signal provided through a trigger interface to issue a trigger event, the voice trigger system being integrated, in a single semiconductor chip forming the application processor, with a host processor, an audio subsystem and a system bus electrically connecting the host processor, the voice trigger system and the audio subsystem;
processing, by the audio subsystem, audio streams through an audio interface of the audio subsystem;
while an audio replay is performed through the audio interface, performing an echo cancellation with respect to microphone data received from a microphone to generate compensated data;
transfer, through a mailbox module connected to the voice trigger system and the audio subsystem, the compensated data to the voice trigger system; and
performing, by the voice trigger system, the voice trigger operation based on the compensated data,
wherein the audio subsystem includes:
an echo canceller configured to perform the echo cancellation,
wherein, while the audio replay is performed through an output pad of the audio interface based on audio output data, the voice trigger system receives the trigger input signal through the trigger interface,
wherein the voice trigger system transfers sample data of the trigger input signal to the audio subsystem using the mail box module,
wherein the echo canceller in the audio subsystem performs the echo cancellation with respect to the sample data based on the audio output data to generate compensated sample data, and the audio subsystem transfers the compensated sample data to the voice trigger system using the mail box module, and
wherein the voice trigger system performs the voice trigger operation based on the compensated sample data.

* * * * *